Figure 1:
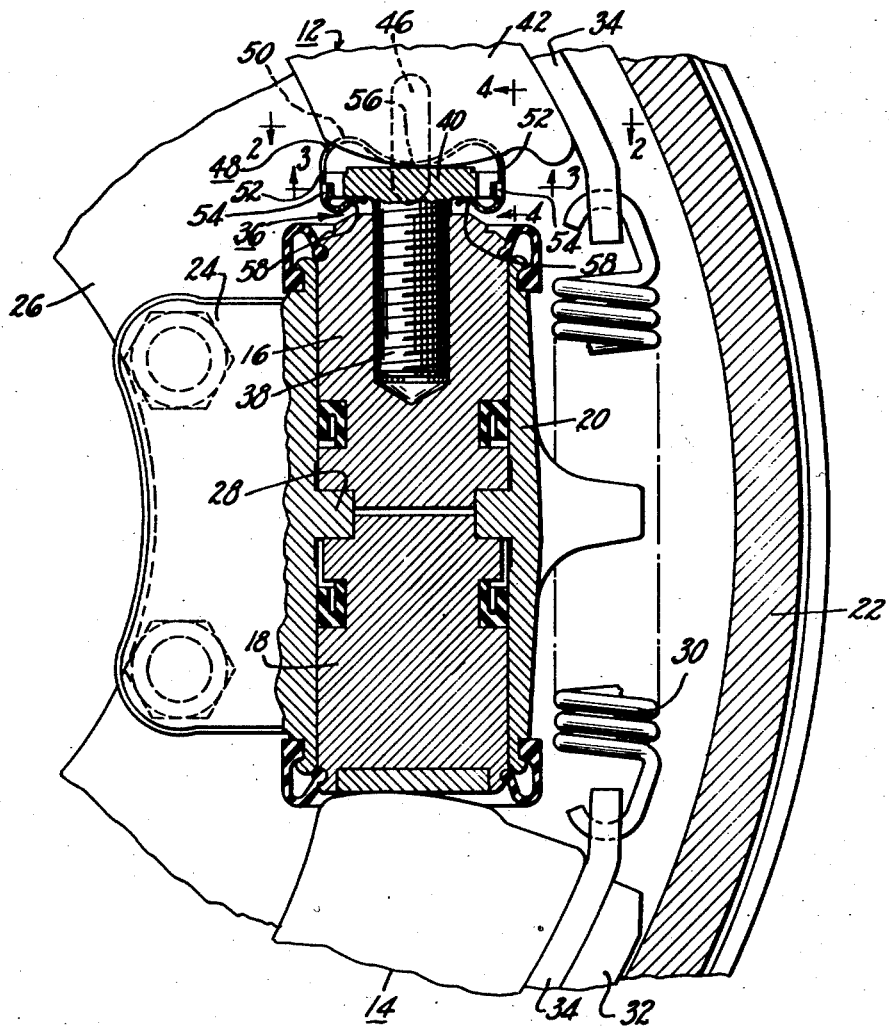

Jan. 2, 1951  V. A. ANDERSON  2,536,410
BRAKE ADJUSTER
Filed Dec. 26, 1947  2 Sheets-Sheet 2
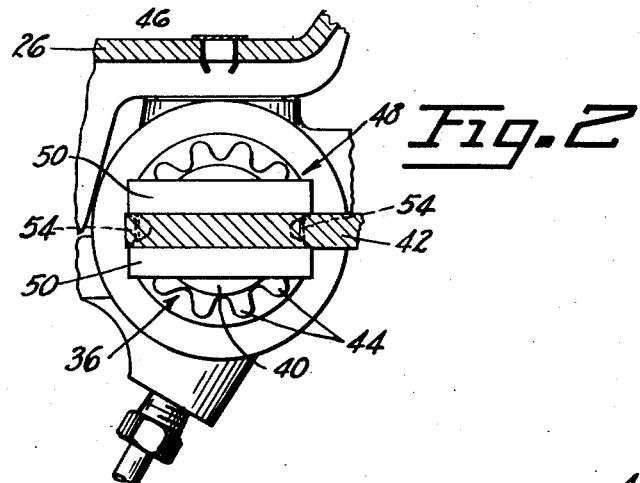
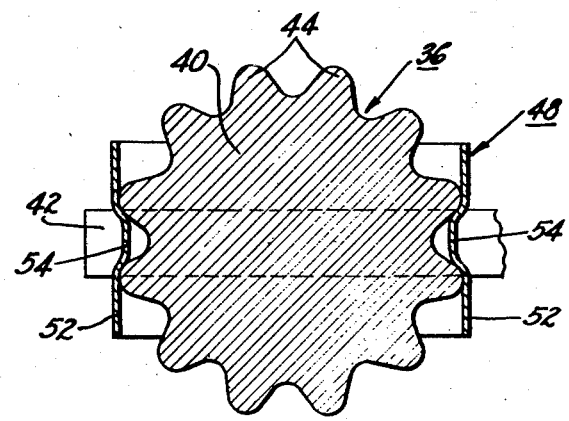
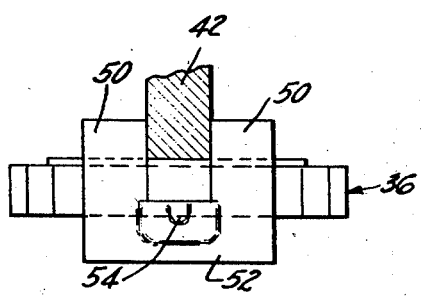
INVENTOR.
VERNAL A ANDERSON
BY
*T. J. Plante*
ATTORNEY Patented Jan. 2, 1951

2,536,410

UNITED STATES PATENT OFFICE 2,536,410

BRAKE ADJUSTER

Vernal A. Anderson, South Bend, Ind., assignor to Bendix Aviation Corporation, South Bend, Ind., a corporation of Delaware Application December 26, 1947, Serial No. 794,047

10 Claims. (Cl. 188—79.5)

This invention relates to an adjustor for a brake of the internal-expanding-shoe type, and particularly to an adjustor that is located between the end of the brake shoe and the actuator or anchor which is arranged to operate the shoe and/or determine its released position, such as the piston of a hydraulic wheel cylinder. An adjustor of this type may consist of a member having a threaded stem screwed into the piston and a head which engages the end of the brake shoe, the head being provided with a serrated, or toothed, periphery to facilitate turning the adjustor.

The primary object of the present invention is to provide a simple and inexpensive retaining member which will cooperate with the adjustor to prevent rotation thereof except when an adjustment is being made, and to give an audible "click" by means of which the mechanic can obtain the proper post-adjustment clearance.

Other objects and advantages of the present invention will become apparent during the following description of an illustrative embodiment, reference being had therein to the accompanying drawings, in which:

Figure 1 is a sectional view of part of a brake assembly, illustrating the application of the invention; and Figures 2, 3, and 4 are sections taken on the lines 2—2, 3—3, and 4—4, respectively, of Figure 1, the latter two figures being made to an enlarged scale.

Referring to the drawings, the brake utilizing my invention may include two "floating" brake shoes 12 and 14 which operatively engage, at one side of the brake, pistons 16 and 18 reciprocably mounted in hydraulic wheel cylinder 20. The wheel cylinder 20 and its pistons may serve both as the actuator for the brake shoes and as the anchor for the shoes. In one direction of rotation of the brake drum 22, shoe 14 will anchor against piston 18 while piston 16 applies shoe 12 against the drum, whereas in the other direction of drum rotation shoe 12 will anchor through piston 16 while piston 18 exerts applying force on shoe 14.

Wheel cylinder 20 is mounted by means of flange 24 on a supporting plate 26 which is adapted to be secured to a non-rotating member, such as the axle housing of an automotive vehicle. The anchoring torque of either of the brake shoes is transmitted through the respective piston to an annular anchor flange 28 provided in the wheel cylinder. This anchor flange also provides the "stop" which determines the released position of the brake shoes, said shoes being urged toward retracted position by means of a return spring 30 which is connected in tension between the shoe ends.

The present invention is concerned with the arrangement and operation of the mechanism whereby the released position of the shoes is adjusted to compensate for wear of the brake linings 32, which are secured to the rims 34 of the shoes. In Figure 1 the adjusting mechanism is provided between piston 16 and shoe 12, it being assumed that adjustment of shoe 14 is accomplished at the opposite end of the shoe, not shown in the figure.

Adjustment of shoe 12 is controlled by an adjustor 36 which has a threaded stem 38 screwed into the outer end of piston 16 and a head 40 which engages the web 42 of the shoe. The head 40 of the adjusting screw has a toothed, or serrated, periphery 44 which enables the mechanic to insert a screw driver or other suitable tool into the teeth of the adjusting screw head to rotate the adjustor and thereby vary the position of the end of the shoe with respect to piston 16. An opening 46 is provided in supporting plate 26 to permit access of the adjusting tool to the head of the adjusting screw.

In order to prevent rotation of the adjusting screw except when an adjustment is being made, and in order to give an audible "click" by means of which the mechanic can obtain proper clearance after adjustment, a resilient detent is provided which cooperates with the teeth on the periphery of the adjusting screw head. The detent consists of a spring metal member 48 which fits over the adjusting screw head and which is prevented from rotating by engagement with the shoe web. The spring metal member 48 has a slotted portion 50 into which one end of the web 42 of brake shoe 12 extends, thereby preventing rotation of the spring metal member. The ends of member 48 are bent over to provide side or end portions 52, each of which has an inwardly extending tooth 54 engaging the teeth formed on the periphery of the adjusting screw head. The teeth 54 prevent the adjusting screw from turning, except when external force is applied for the purpose of adjusting the position of the brake shoe. When such force is applied, the resilience of member 48 permits the adjusting screw to be easily turned, giving an audible "click" as the teeth of the detent ride over successive teeth on the adjusting screw.

The "click" enables the mechanic to accurately adjust the position of the brake shoe because he can be instructed to turn the adjusting screw until the shoe is in full engagement with the drum, and then back off the adjusting screw until the detent has passed a given number of teeth.

Member 48 is so formed and arranged as to be firmly held in position in the brake assembly. For this purpose, the arms 52 are provided at both ends of member 48, rather than at one end only, because endwise movement of the member is thereby prevented. Furthermore, the slotted portion 50 of member 48 is bent inwardly, as shown at 56, to engage the top of the adjusting screw head; and the extremities 58 of the arms 52 are also bent inwardly, as shown, to engage the underside of the adjusting screw head, thereby holding member 48 firmly in place on the adjusting screw.

Although only a single embodiment of the invention has been illustrated and described, it will be obvious that various modifications can be made to suit requirements.

I claim:

1. In a brake having a T-section brake shoe, an actuator having a piston arranged to selectively operate or anchor the shoe, and an adjustor having a threaded stem screwed into the piston and a head which engages the shoe and which has a toothed periphery; a resilient detent constituted by a spring-metal member having a slotted portion into which one end of the web of the brake shoe extends to prevent rotation of the spring-metal member, and having two bent-over end portions each of which has a tooth engaging the periphery of the adjustor head at one side thereof, the extremities of said end portions engaging the underside of the adjustor head, and the center part of the slotted portion engaging the top of the adjustor head.

2. In a break having a brake shoe, a member arranged to anchor the shoe, and an adjustor having a stem carried by said member and a head which engages the shoe and which has a toothed periphery; a resilient detent constituted by a spring-metal member having a slotted portion into which one end of the brake shoe extends to prevent rotation of the spring-metal member, and having two bent-over end portions each of which has a tooth engaging the periphery of the adjustor head at one side thereof, the extremities of said end portions engaging the underside of the adjustor head, and the center part of the slotted portion engaging the top of the adjustor head.

3. In a brake having a brake shoe, a member arranged to locate the shoe in released position, and an adjustor having a stem carried by said member and a head which engages the shoe and which has a toothed periphery; a resilient detent constituted by a spring-metal member having a slotted portion into which one end of the brake shoe extends to prevent rotation of the spring-metal member, and having bent-over end portions each of which has a tooth engaging the periphery of the adjustor head at one side thereof, the extremities of said end portions engaging the underside of the adjustor head, and the center part of the slotted portion engaging the top of the adjustor head.

4. In a brake having a brake shoe, a member arranged to locate the shoe in released position, and an adjustor carried by said member having a head which engages the shoe and which has a toothed periphery; a resilient detent constituted by a spring-metal member having a slotted portion into which one end of the brake shoe extends to prevent rotation of the spring-metal member, and having at least one bent-over end portion which has a tooth engaging the periphery of the adjustor head at one side thereof, the extremity of said end portion engaging the underside of the adjustor head, and the center part of the slotted portion engaging the top of the adjustor head.

5. In a brake having a brake shoe, a member arranged to locate the shoe in released position, and an adjustor carried by said member having a head which engages the shoe and which has a toothed periphery; a resilient detent constituted by a member having a slotted portion into which one end of the brake shoe extends to prevent rotation of said member, and having at least one bent-over end portion which has a tooth engaging the periphery of the adjustor head at one side thereof, the extremity of said end portion engaging the underside of the adjustor head, and the center part of the slotted portion engaging the top of the adjustor head.

6. In a brake having a brake shoe, a member arranged to locate the shoe in released position, and an adjustor mounted on said member having a head which engages the shoe and which has a toothed periphery; a resilient detent constituted by a member engaging the top and under sides of said head and having a slotted portion into which one end of the brake shoe extends to prevent rotation of said member, said detent having at least one bent-over end portion which has a tooth engaging the periphery of the adjustor head at one side thereof.

7. In a brake having a brake shoe, a member arranged to locate the shoe in released position, and an adjustor mounted on said member having a head which engages the shoe and which has a toothed periphery; a resilient detent constituted by a member having a slotted portion into which one end of the brake shoe extends to prevent rotation of said member, and having at least one bent-over end portion which has a tooth engaging the periphery of the adjustor head at one side thereof, the extremity of said end portion engaging the underside of the adjustor head.

8. In a brake having a brake shoe, a member arranged to locate the shoe in released position, and an adjustor mounted on said member having a head which engages the shoe and which has a toothed periphery; a resilient detent constituted by a member having a slotted portion into which one end of the brake shoe extends to prevent rotation of said member, and having at least one bent-over end portion which has a tooth engaging the periphery of the adjustor head at one side thereof, the center part of the slotted portion engaging the top of the adjustor head.

9. In a brake having a brake shoe, a member arranged to locate the shoe in released position, and an adjustor mounted on said member having a head which engages the shoe and which has a toothed periphery; a detent engaging the top and under sides of said head and having a slotted portion into which one end of the brake shoe extends, said detent having a bent-over end portion which has a tooth engaging the periphery of the adjustor head.

10. In a brake having a brake shoe, a member arranged to locate the shoe in released position, and an adjustor mounted on said member arranged to act on the shoe and having a toothed periphery; a detent carried against axial movement by and with respect to said adjustor and having a tooth engaging the periphery of the adjustor and a slotted portion into which the shoe extends.

VERNAL A. ANDERSON.

REFERENCES CITED

The following references are of record in the file of this patent:

UNITED STATES PATENTS

| Number | Name | Date |
|---|---|---|
| 2,303,699 | Main | Dec. 1, 1942 |
| 2,313,431 | Goepfrich | Mar. 9, 1943 |